United States Patent [19]

DeNicola, Jr. et al.

[11] Patent Number: 5,140,074
[45] Date of Patent: Aug. 18, 1992

[54] METHOD OF PRODUCING OLEFIN POLYMER GRAFT COPOLYMERS

[75] Inventors: Anthony J. DeNicola, Jr., Newark, Del.; Suhas Guhaniyogi, Bear, Del.

[73] Assignee: Himont Incorporated, Wilmington, Del.

[21] Appl. No.: 625,287

[22] Filed: Dec. 10, 1990

Related U.S. Application Data

[63] Continuation-in-part of Ser. No. 471,149, Jan. 26, 1990, abandoned.

[51] Int. Cl.$^5$ .................. C08F 255/02; C08F 255/04; C08F 255/10
[52] U.S. Cl. ................................. 525/263; 525/279; 525/282; 525/283; 525/285; 525/296; 525/302; 525/303; 525/301; 525/309; 525/313; 525/319; 525/324; 525/904
[58] Field of Search ............... 525/263, 309, 319, 324, 525/904

[56] References Cited

U.S. PATENT DOCUMENTS

| | | | |
|---|---|---|---|
| 3,177,269 | 4/1965 | Nowak et al. | 525/263 |
| 3,177,270 | 4/1965 | Jones et al. | 525/263 |
| 3,240,843 | 3/1966 | Nelson et al. | |
| 3,886,233 | 5/1975 | Visseren | 525/263 |
| 4,278,777 | 7/1981 | Jakabhazy et al. | 525/904 |
| 4,595,726 | 6/1986 | Klosiewicz | |
| 4,661,549 | 4/1987 | Walker | 525/309 |

FOREIGN PATENT DOCUMENTS

| | | | |
|---|---|---|---|
| 109532 | 5/1984 | European Pat. Off. | |
| 351866 | 1/1990 | European Pat. Off. | |
| 135622 | 5/1979 | German Democratic Rep. | |
| 835578 | 5/1960 | United Kingdom | 525/904 |
| 878443 | 9/1961 | United Kingdom | 525/904 |

*Primary Examiner*—Carman J. Seccuro, Jr.

[57] ABSTRACT

Disclosed is a method of making graft copolymers of olefin polymers by contacting a particulate olefin polymer with a free radical polymeriztion initiator, e.g., a peroxide, and a vinyl monomer at about from 60° to 125° C., while controlling the monomer addition rate so that it does not exceed about 4.5 pph/min, and most preferably does not exceed about 3.0 pph/min, at any monomer feed level. To prevent polymer degradation, a non-oxidizing environment is maintained throughout the process, and residual free radicals are deactivated, and unreacted initiator is decomposed, before the graft copolymer is exposed to air.

21 Claims, No Drawings

METHOD OF PRODUCING OLEFIN POLYMER GRAFT COPOLYMERS

This application is a continuation-in-part of U.S. patent application Ser. No. 07/471,149, filed Jan. 26, 1990 abandoned.

FIELD OF THE INVENTION

The present invention relates to a method of making graft copolymers of polyolefins, and, more particularly, to a method of graft polymerizing monomers at free radical sites produced on olefin polymer backbones by chemical free radical initiators of polymerization.

BACKGROUND OF THE INVENTION

Graft copolymers of polypropylene have been of interest for some time because they are capable of possessing some properties of the grafted polymer (produced by the homo- or copolymerization of the monomer or monomers, respectively) as well as of the polypropylene backbone. It has been suggested, for example, that some of these graft copolymers be used as compatibilizers for normally immiscible polymer systems and as components of gum plastic compositions.

The preparation of graft copolymers by creating active sites on the main polymer chain or backbone, and initiating graft polymerization of a polymerizable monomer at these sites, is well-known. Procedures which have been used for introducing such active sites into the polymer chain have included treatment with organic chemical compounds capable of generating free radicals, and irradiation. In the chemical method, an organic chemical compound capable of generating free radicals, such as a peroxide or azo compound, is decomposed in the presence of the backbone polymer with the formation of free radicals, which form the active grafting sites on the polymer and initiate the polymerization of the monomer at these sites.

Of the various techniques which have been employed for preparing graft copolymers of polyolefins by the chemical method of free radical generation, the bulk technique, in which the polymer particles are contacted directly with the initiator and monomer, without the intervention of a liquid suspending medium or a solvent, is advantageous in terms of simplicity of execution and the avoidance of side-reactions caused by the presence of certain solvents or suspending media, such as water. However, regardless of the physical state of the polymer to be grafted, the grafting process is subject to problems such as degradation of the polyolefin, possibly leading to a graft copolymer having an undesirably high melt flow rate, and excessive formation of the homopolymer of the grafting monomer at the expense of the formation of the polyolefin graft copolymer.

U.S. Pat. No. 4,595,726 discloses graft copolymers of 3-100%, preferably 3-30%, by weight of an alkyl methacrylate moiety grafted onto a polypropylene backbone. The graft copolymers, useful as adhesives in polypropylene laminates, are prepared at a temperature below the softening point of polypropylene by a solvent-free reaction, reportedly vapor-phase, between polypropylene and the methacrylate monomer in the presence of a free-radical-forming catalyst. A preferred initiator is tert-butyl perbenzoate, stated as having a 15-minute half-life at 135° C., and reactor temperatures of 135° C. and 140° C. are disclosed. Degradation of the polypropylene chain due to the reaction conditions employed is reported. Immediately after the peroxide is added to the polypropylene, the monomer is added over a time period which is fixed by the half-life of the peroxide initiator (i.e., 1-2 half-lives). In other words, according to the teachings of U.S. Pat. No. 4,595,726, for a given initiator half-life, it is necessary to employ a higher rate of addition of the monomer as the total amount of monomer to be added increases.

The preparation of "graft-type" copolymers by dissolving an organic peroxide in a monomer and adding the solution to free-flowing particles of the base polymer, particularly polyvinyl chloride, is described in U.S. Pat. No. 3,240,843. The "graft-type" products are described as having monomeric, as opposed to polymeric, branches attached to the polymer backbone. Homopolymerization of the monomer also is mentioned. To avoid particle agglomeration, the amount of monomer added cannot exceed the maximum absorbable by the polymer particles. In the case of polypropylene charged into a reactor with a solution containing styrene, butadiene, acrylonitrile, and benzoyl peroxide, the total amount of monomers added is only 9% of the amount of polypropylene charged.

SUMMARY OF THE INVENTION

The present invention provides a method of making an olefin polymer graft copolymer wherein free radical sites are produced in a particulate olefin polymer material by treating the polymer material at a temperature of about from 60° to 125° C. with about from 0.1 to 6.0 pph (parts by weight per 100 parts by weight of the olefin polymer material) of an organic chemical compound which is a free radical polymerization initiator and has a decomposition half-life of about from 1 to 240 minutes at the temperature employed.

Over a time period which coincides with, or follows, the period of initiator treatment, with or without overlap, the polymer material is treated with about from 5 to 240 pph of a grafting monomer which is capable of being polymerized by free radicals, the temperature employed during any period of monomer treatment being as indicated above with respect to initiator treatment. The addition of the grafting monomer to the polymer material is controlled so that at all addition levels of about from 5 to 240 pph, the rate of addition does not exceed about 4.5, preferably does not exceed about 4.0, and most preferably does not exceed about 3.0, pph per minute.

After the grafting period, i.e., the period of treatment with the grafting monomer, and any hold period at reaction conditions subsequent thereto, any unreacted monomer is removed from the resultant grafted particulate olefin polymer material, and the decomposition of any unreacted initiator and deactivation of any residual free radicals are promoted, e.g., by a temperature increase. During the entire process the polymer material is maintained in a substantially non-oxidizing environment.

DETAILED DESCRIPTION

The method of this invention embodies a combination of steps which together permit olefin polymer graft copolymers to be obtained not only in high conversions (monomer consumption) but also with a high degree of graft efficiency. Moreover, degradation of the backbone olefin polymer is minimized, thereby avoiding the production of a graft copolymer having a melt flow rate which is substantially higher than that of the starting backbone olefin polymer, a condition that can adversely affect the processing behavior of the graft copolymer.

While not wishing to be bound or limited in any way by theoretical considerations, we believe that the high degree of efficiency afforded by the method of the invention is related to the manner in which the grafting monomer is brought into contact with the olefin polymer particles in which free radical sites have been, and/or are being, produced by contact of the initiator with the heated particles. The low rate of addition of the monomer, i.e., a rate not exceeding about 4.5, preferably no greater than about 4.0, and most preferably no greater than about 3.0, pph per minute, creates an essentially "dry" condition in which the monomer liquid and the initiator come together in the presence o: heat (i.e., that needed to decompose the initiator) instead of in a large volume of monomer liquid. It has been found that homopolymerization of the monomer, at the expense of a graft polymerization reaction, becomes more prevalent at rates of monomer addition which result in a buildup of monomer liquid within and between polymer particles. It is believed that, in the latter case, the so-called "wet" condition due to the buildup of monomer liquid may facilitate or promote the self-polymerization of the monomer rather than graft polymerization with the olefin polymer particles.

In the present process, the monomer feed rate can be as low as desired, and the minimum generally will be dictated by the capability of available equipment and economic considerations. While rates of at least about 0.1–0.2 pph/min can be used, a preferred practical minimum is about 0.3 pph/min. Preferred rates in any particular case will depend on such factors as the monomer feed level, the initiator/monomer addition mode, and the reactivity of the particular monomer used.

The addition of monomer at a rate of about from 0.1 to 4.5 pph/min, preferably about from 0.3 to 4.0 pph/min and most preferably 0.3 to 3.0 pph/min results in high graft efficiencies with high monomer conversions over a wide range of monomer feed levels. The monomer addition rates set forth above, including those above the preferred maximum, are suitable with lower monomer feed levels, e.g., levels of up to about 40 pph. Also, a maximum monomer addition rate of about 4.0 pph/min is preferred provided that the monomer feed level does not exceed about 40 pph. With feed levels above about 40 pph, addition rates of about 0.3 to about 3.0 pph/min are used to provide high graft efficiencies. Such rates are most preferred in the present process because of their applicability over a wider range of monomer feed levels. With the most preferred monomer addition rates, and especially at rates up to about 3.0 pph/min, high graft efficiencies are attained at high monomer conversions regardless of addition mode even at high monomer feed levels of 100 pph and above.

The above-specified monomer addition rate must be adhered to at all addition levels of monomer to be added, i.e., addition levels of about from 5 to 240 pph, and is of increasingly greater importance at higher addition levels. In contrast, the fixed addition time advocated by the aforementioned U.S. Pat. No. 4,595,726 results in the use of the highest monomer addition rates at the highest addition levels, i.e., the very levels at which, according to the present invention, low addition rates are most important. A fixed addition time, e.g., 1–2 half-lives of an initiator such as tert-butyl perbenzoate, as taught in the aforementioned patent, will not be long enough to result in a sufficiently low addition rate at the large monomer additions needed to produce high graft levels with a high degree of efficiency.

In one embodiment of the present method, the time period during which the mass of olefin polymer particles is treated with the grafting monomer follows the time period during which the particle mass is treated with the initiator. In this case (separate-addition mode), the initiator is added first to the particles, which are preferably heated to the temperature being used, and the production of free radical sites in the olefin polymer material begins. The addition of the monomer may begin immediately after the addition of the initiator has been completed, or after a delay or hold time subsequent to the completion of the initiator addition. Separate additions also can be multi-staged whereby the additions are incremental and the initiator/monomer addition sequence is repetitive. In another embodiment, the initiator and the monomer are added to the heated polymer particles at the same time (concurrent-addition mode), e.g., by combining the initiator (neat or a liquid solution thereof) and the monomer (neat or a liquid solution thereof) at a temperature at which no appreciable decomposition of the initiator occurs. The concurrent addition of separate initiator and monomer streams also can be employed, as well as a combination of separate addition and concurrent addition, in which the monomer addition period follows the initiator addition period with overlap. Whether the initiator and monomer are added concurrently or monomer addition follows initiator addition, either the initiator or monomer, or both, can be added continuously or intermittently. The method of the invention can be carried out as a semi-batch, semi-continuous, or continuous process.

In the present process the particulate olefin polymer material which is treated with the initiator and the grafting monomer is at a temperature of about from 60° to 25° C., preferably about from 80° to 120° C. While temperatures below about 60° C. can be used, the decomposition half-life of many free radical initiators at such temperatures is so long as to be impractical, and initiators having a short enough half-life below about 60° C. often are difficult to handle. Above about 125° C., the sharp reduction in decomposition half-life which occurs with many initiators causes the monomer conversion to drop, especially in the separate-addition mode. Moreover, initiators having longer half-lives at temperatures above about 125° C. tend to have an adverse effect on the olefin polymer and/or the resulting graft copolymer.

Treating the olefin polymer material with the initiator and the monomer at a temperature as set forth above provides an initiator half-life of about from 1 to 240 minutes. After the addition of the monomer, the thus-treated polymer material may be maintained at the selected temperature for at least about 3, and most preferably at least about 10, minutes. This hold period may be extended to several hours, especially at lower temperatures. Preferably the initiator and temperature will be selected to allow grafting to be completed within about 2 to 10 initiator half-lives. Conditions that result in half-lives below about 2 minutes are not preferred, especially in the separate-addition mode with delayed monomer addition, inasmuch as the conversion may be deleteriously affected if the initiator is allowed to decompose rapidly before the monomer addition begins.

To assure a high conversion and graft efficiency, and effective use of the initiator, a time of at least about 1, preferably at least about 2, initiator half-lives at the selected temperature should elapse between the start of the initiator addition period and the end of the monomer removal step. The time from the start of monomer addition to the end of the grafting period depends on the amount of monomer used and the rate of addition, longer times being used at lower temperatures and higher monomer feed levels. At the monomer addition rates used in the present process, the hold period, if any, after completion of the monomer addition generally is as stated above, longer hold periods after monomer addition preferably being used at lower temperatures and higher monomer feed levels. In the separate-addition mode, preferably no more than about 2.5 initiator half-lives should separate the initiator and monomer addition periods to assure the availability of the necessary free radicals once the addition of the monomer begins.

The olefin polymer material useful in the practice of the method of this invention for making graft copolymers of olefin polymers is (a) a homopolymer of a linear or branched $C_{2-8}$ 1-olefin; (b) a random copolymer of a linear or branched $C_{2-8}$ 1-olefin with a different olefin selected from the group consisting of $C_{2-10}$ 1-olefins, provided that, when the different olefin is ethylene, the maximum polymerized ethylene content is about 10%, preferably about 4%, by weight; when the olefin is propylene and the different olefin is a $C_{4-10}$ 1-olefin, the maximum polymerized content thereof is about 20%, preferably about 16%, by weight; and when the olefin is ethylene and the different olefin is a $C_{3-10}$ 1-olefin, the maximum polymerized content thereof is about 10%, preferably about 5%, by weight; (c) a random terpolymer of a linear or branched $C_{3-8}$ 1-olefin and two different olefins selected from the group consisting of ethylene and $C_{4-8}$ 1-olefins, provided that the maximum polymerized content of the different $C_{4-8}$ 1-olefins is about 20%, preferably about 16%, by weight, and, when ethylene is one of the different olefins, the maximum polymerized ethylene content is about 5%, preferably about 4%, by weight; or (d) a homopolymer of (a) or a random copolymer of (b) which is impact-modified with about from 10 to 60% of (i) an ethylene-propylene rubber having an ethylene content of about from 7 to 70%, preferably about from 7 to 40%, most preferably about from 10 to 40%, (ii) an ethylene/butene-1 copolymer rubber (EBR) having an ethylene content of from 30 to 70%, (iii) a propylene/butene-1 copolymer rubber (PBR) having a butene-1 content of from 30 to 70%, (iv) an ethylene-propylene-nonconjugated diene monomer rubber (EPDM) having an ethylene content of 30 to 70% and diene content of from 1 to 10%, (v) an ethylene/propylene/butene terpolymer rubber (EPBR) having a propylene content of from 1 to 10% and butene content of from 30 to 70% or a propylene content of from 30 to 70% and butene content of from 1 to 10%.

The $C_{2-8}$ 1-olefins which can be used in the preparation of the olefin polymer materials as described above include, for example, ethylene, propylene, 1-butene, isobutylene, 3-methyl-1-butene, 3,4-dimethyl-1-butene, 1-pentene, 4-methyl-1-pentene, 1-hexene, 3-methyl-1-hexene, 1-heptene and the like. Propylene and 1-butene are the preferred $C_3$-$C_8$ 1-olefin monomers.

$C_{3-10}$ 1-olefins which can be used in the preparation of the olefin polymer materials as described above include linear and branched olefins such as those listed above for the $C_{2-8}$ 1-olefins which have at least 3 carbon atoms.

When the olefin polymer is an ethylene homopolymer, it has a density of 0.91 g/cm³ or greater, and when the olefin polymer is an ethylene copolymer with a $C_{3-10}$ alpha-olefin, it has a density of 0.91 g/cm³ or greater. Suitable ethylene copolymers include ethylene/butene-1, ethylene/hexene-1 and ethylene/4-methyl-1-pentene. The ethylene copolymer can be a HDPE or a LLDPE, and the ethylene homopolymer can be a HDPE or a LDPE. Typically the LLDPE and LDPE have densities of 0.91 g/cm³ or greater and the HDPE have densities of 0.95 g/cm³ or greater.

The impact-modified olefin polymer can be prepared by first polymerizing a $C_{2-8}$ 1-olefin to form a homopolymer of said olefin, or copolymerizing such an olefin with a different olefin selected from $C_{2-10}$ 1-olefins, and then polymerizing the relevant monomers to form the rubber in the presence of said homopolymer or copolymer in a reactor or series of reactors. Alternatively, mechanical blends can be prepared by separately polymerizing 1) the particular olefin to form the homo- or copolymer and 2) the relevant monomers to form the rubber, and then physically mixing the homo- or copolymer with the rubber until a homogeneous blend is obtained. Reactor blends are preferred when an impact-modified olefin polymer is used.

Homopolymers of butene-1, HDPE and LLDPE are preferred. Homopolymers, random copolymers, random terpolymers, and impact-modified homopolymers and copolymers of propylene are also preferred and are the most preferred olefin polymer materials for use in the present process and are referred to herein, individually or collectively, as propylene polymer materials.

Suitable particulate forms of the olefin polymer material used in the present method include powder, flake, granulate, spherical, cubic and the like. Spherical particulate forms are preferred. The pore volume fraction of the particles can be as low as about 0.04, but it is preferred that the grafting be effected on olefin polymer particles having a pore volume fraction of at least 0.07. Most preferably, the olefin polymer used in the present method will have a pore volume fraction of at least about 0.12, and most preferably at least about 0.20, with more than 40%, preferably more than 50%, and most preferably more than 90%, of the pores having a diameter larger than 1 micron, a surface area of at least 0.1 m²/g, and a weight average diameter of about from 0.4 to 7 mm. In the preferred polymer, grafting takes place in the interior of the particulate material as well as on the external surface thereof, resulting in a substantially uniform distribution of the graft polymer throughout the olefin polymer particle.

According to the method of the invention, free radical or active sites are produced in the particulate olefin polymer material by treating the polymer material with an organic compound which is a free-radical-generating polymerization initiator and has a decomposition half-life at the temperature employed of about from 1 to 240, preferably about from 5 to 100, and most preferably about from 10 to 40, minutes. Organic peroxides, and especially those which generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butyl peroxyisopropylbenzene); peroxy esters, such as tert-butylperoxypivalate, tert-butyl perbenzoate, 2,5- dimethylhexyl 2,5-di(perbenzoate), tert-butyl di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. Azo compounds, such as azobisisobutyronitrile, also may be used. Two or more initiators having the same or different half-lives may be employed.

The initiator, if a liquid at the decomposition temperature used, may be used neat or in solution. If a solid at the decomposition temperature used, it may be dissolved in a suitable liquid solvent. The concentration of the initiator in solution typically should be about from 5% to 98% by weight. Peroxide initiators are available in hydrocarbon solutions at a concentration of about from 12.5 to 75 weight %. Whether neat or in solution, the active concentration of the initiator per se should be about from 0.1 to 6.0 pph, preferably about from 0.2 to 3.0 pph, to assure the generation of a sufficient number of free radical sites on and in the olefin polymer material.

The grafting monomers useful in accordance with this invention may be any monomeric vinyl compound capable of being polymerized by free radicals wherein the vinyl radical, $H_2C=CR-$, in which $R=H$ or methyl, is attached to a straight or branched aliphatic chain or to a substituted or unsubstituted aromatic, heterocyclic, or alicyclic ring in a mono- or polycyclic compound. Typical substituent groups may be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloracetate, vinyl cyanoacetate, vinyl propionate, and vinyl benzoate; and (3) unsaturated aliphatic nitriles and carboxylic acids and their derivatives, including acrylonitrile, methacrylonitrile, acrylamide, methacrylamide, acrylic acid, acrylate esters, such as the methyl, ethyl, hydroxyethyl, 2-ethylhexyl, and butyl acrylate esters, methacrylic acid, ethacrylic acid, and methacrylate esters, such as the methyl, ethyl, butyl, benzyl, phenylethyl, phenoxyethyl, epoxypropyl, and hydroxypropyl methacrylate esters, maleic anhydride, and N-phenyl maleimide. Freeradical-polymerizable dienes, such as butadiene, isoprene and their derivatives, also can be used. Multiple monomers from the same or different classes may be employed.

Of the various vinyl monomers that can be used, styrene, acrylonitrile, butyl acrylate, 2-ethylhexyl acrylate, methyl methacrylate and mixtures thereof are preferred. Two or more monomers may be grafted simultaneously onto the olefin polymer material by the present process to produce different homopolymer or copolymer grafts or both on the olefin polymer backbone depending on the relative reactivity of the monomers employed. Alpha-methylstyrene and maleic anhydride will graft, but do not readily homopolymerize. Hence they must be used in combination with another vinyl compound, such as styrene, with which they copolymerize and which is capable of free radical-initiated polymerization.

The grafting monomer, if liquid at room temperature, can be used neat or in combination with a solvent or diluent which is inert with respect to the particulate polymer material and is not polymerizable by free radicals. If a solid at room temperature, the grafting monomer can be used in solution in a solvent therefor which is inert as set forth above. Mixtures of neat monomer, diluted monomer, and/or dissolved monomer can be used. In all cases, whether or not a solvent or diluent is present, the amount of grafting monomer given above (i.e., about from 5 to 240 parts by weight per 100 parts by weight of olefin polymer material) is based on the actual monomer content.

When a diluent for the monomer is used, less than about 70%, preferably no more than about 50%, and most preferably no more than about 25% by weight, based on the weight of the monomer and the diluent is used to avoid excessive drops in graft level. Use of solvent in excess of the amount required to dissolve the monomer should be avoided for the same reason.

Solvents or diluents useful in the practice of the method of this invention are those compounds which are inert as described above and which have a chain-transfer constant of less than about $1 \times 10^{-3}$. Suitable solvents or diluents include ketones, such as acetone; alcohols, such as methanol; aromatic hydrocarbons, such as benzene and xylene; and cycloaliphatic hydrocarbons, such as cyclohexane.

In the method of the invention the particulate olefin polymer material is maintained in a substantially non-oxidizing atmosphere, e.g., under inert gas, during such time that free radicals are present therein. The olefin polymer material is also maintained in such an atmosphere during the formation of the free radicals. The reason for this is that, upon exposure to an oxidizing atmosphere such as air, the free radicals are converted to peroxy radicals, which visbreak or degrade the polymer material thereby causing substantial reductions in molecular weight with concomitant increases in melt flow rate. Moreover, with essentially all monomers, the presence of large amounts of air during the treatment with monomer interferes with the graft polymerization per se. Therefore, the treatment of the polymer with the initiator and with the grafting monomer is carried out in a substantially non-oxidizing atmosphere, as are the subsequent steps of the method.

The expression "substantially non-oxidizing", when used herein to describe the environment or atmosphere to which the olefin polymer material is exposed, means an environment in which the active-oxygen concentration, i.e., the concentration of oxygen in a form that will react with the free radicals in the polymer material, is less than about 15%, preferably less than about 5%, and most preferably less than about 1%, by volume. The most preferred concentration of active oxygen is 0.004% or lower by volume. Within these limits, the non-oxidizing atmosphere can be any gas, or mixture of gases, which is oxidatively inert toward the free radicals in the olefin polymer material, e.g., nitrogen, argon, helium, and carbon dioxide.

After the olefin polymer material has been maintained in contact with the monomer for the selected period of time, the resulting graft copolymer, while still maintained in a substantially non-oxidizing environment, is treated, preferably by heating, so as to decompose any unreacted initiator, if any, and to deactivate substantially all of the residual free radicals therein. This substantially completely eliminates the possibility of the formation of peroxy radicals in the graft copolymer upon its exposure to air, which radicals can cause visbreaking or degradation of the polymer. Generally, heating at a temperature of at least about 110° C. for at least about 5 minutes, preferably at least 120° C. for at least 20 minutes, is sufficient.

Any unreacted grafting monomer is removed from the graft copolymer, either before or after any unreacted initiator has been decomposed and any residual free radicals have been deactivated, or at the same time as the latter step. If the removal is effected before or during the final decomposition and/or deactivation, a substantially non-oxidizing environment is maintained. Preferably, any unreacted grafting monomer is removed after any unreacted initiator has been decomposed and any residual free radicals have been deactivated, or during the decomposition/deactivation. In one preferred embodiment, the monomer is removed from the graft copolymer in a nitrogen (or other inert gas) purge at the selected initiator-decomposition temperature, e.g., about 120° C.

The following examples, presented for illustrative purposes, describe various embodiments of the method of the invention. Unless otherwise indicated, all parts and percentages are by weight, and all initiator amounts are on an active basis. All melt flow rates (MFRs) for the graft copolymers produced were measured on the extruded and pelletized copolymer.

EXAMPLE 1

Four hundred grams of a finely divided porous propylene homopolymer (LBD-406A commercially available from HIMONT Italia S.r.l.) are placed in a 2-liter glass reactor equipped with a heating jacket and a helical impeller. The polymer is in the form of generally spherical particles having the following characteristics: nominal melt flow rate (ASTM Method D 1238-82, Condition L) 8 dg/min; intrinsic viscosity (method of J. H. Elliott et al., J. Applied Polymer Sci. 14, 2947-2963 (1970) - polymer dissolved in decahydronaphthalene at 135° C.) 2.4 dl/g; surface area (B.E.T.) 0.34 m$^2$/g; weight average diameter 2.0 mm: and pore volume fraction (mercury porosimetry method) 0.33. More than 90% of the pores in the porous particles are larger than 1 micron in diameter.

The reactor is purged with nitrogen at room temperature for 15 minutes (to an active oxygen content of less than 0.004% by volume) and then heated to 100° C. by circulating hot oil through the reactor jacket, and equilibrated to that temperature while nitrogen purging and stirring at 225 rpm continues. Thereafter, purging is stopped, the reactor pressure is adjusted to 14 kPa, and 8 ml of an oxygen-free mineral spirit solution of tert-butylperoxy-2-ethylhexanoate containing 4.0g of the peroxy ester is sprayed onto the hot polymer. This peroxy ester has a half-life of 26 minutes at 100° C. After 10 minutes, 283 g of styrene, which has been purged with nitrogen at 5°-10° C., is sprayed into the reactor at a rate of 1.20 pph (parts per 100 parts polypropylene, by weight) per minute. The total addition time is 60 minutes. The reactor is maintained at 100° C. and stirring continued for 60 minutes after all of the styrene has been added, the temperature of the sprayed polymer rising approximately 5°-10° C. owing to the reaction exotherm.

At the end of the grafting period, the reactor is purged with nitrogen for 15 minutes, and the reactor contents then are heated to 120° C. by purging with heated nitrogen. The reactor temperature is maintained at 120° C. for 20 minutes during which time any unreacted styrene monomer is swept out of the reactor in the nitrogen flow. After cool-down under a nitrogen blanket, the free-flowing solid product remaining in the reactor is discharged therefrom, dried, and weighed. It weighs approximately 677 grams. Analysis of this product indicates that 98% of the styrene has been converted to polystyrene. Analysis of the insoluble portion of the product which remaines after Soxhlet extraction with methyl ethyl ketone at 80° C. for 2 hours indicates that the polystyrene content of the polystyrene-grafted polypropylene is 37.5%, i.e., a graft level of 60.0 pph from a styrene feed level of 70.8 pph. The graft efficiency (graft level/total polystyrene) is 6%. The MFR of the graft copolymer is 1.6 dg/ min.

EXAMPLE 2

The procedure and ingredients of Example 1 are used with the exception that the amount of propylene homopolymer used is 350 g, the amount of the peroxy compound used is 7 g, the amount of styrene used is 248 g, the styrene feed rate is 1.22 pph/min, and the delay between peroxide and styrene additions is 20 minutes. The conversion is 98%, the graft level 56.1 pph, the graft efficiency 81%, and the MFR 0.2 dg/min.

EXAMPLE 3

The procedure and ingredients of Example 1 are used with the exception that the styrene and the peroxy ester are mixed together at 5°-10° C. in a capped glass bottle, and, after purging with nitrogen for approximately 15 minutes, the resulting homogeneous solution is sprayed over the hot polymer at a rate of 1.28 pph/min (addition time: 55 minutes). The conversion is 100%, the graft level 58.8 pph, and the graft efficiency 83%. The MFR is 2.1 dg/min.

EXAMPLE 4

The procedure and ingredients of Example 3 are used except that the amount of propylene homopolymer used is 350 g, the amount of the peroxy compound used is 3.5 g, the amount of styrene used is 248 g, and the styrene/initiator feed rate is 0.35 pph/min (addition time: 3.4 hours). The conversion is 98%, the graft level 61.8 pph, the graft efficiency 88%, and the MFR 2.1 dg/min.,

EXAMPLE 5-11

The procedure and ingredients of Example 1 or 3 are used with variations in styrene feed level and/or feed rate as set forth in Table I. The results are also shown in Table I.

TABLE I

| Ex No. | Procedure | Styrene Feed (pph) | Feed Rate pph/min | Conv. % | Graft Level pph | Graft Eff. % | MFR (dg/min) |
|---|---|---|---|---|---|---|---|
| 5 | Ex. 1 | 70.8 | 2.36 | 98 | 59.3 | 86 | 0.8 |
| 6 | Ex. 3 | 70.8 | 2.42 | 98 | 57.8 | 83 | 2.2 |
| 7[a] | Ex. 1 | 101.1 | 1.37 | 96 | 85.0 | 87 | 0.8 |
| 8[a] | Ex. 3 | 101.1 | 1.37 | 100 | 95.3 | 94 | 1.0 |

TABLE I-continued

| Ex No. | Procedure | Styrene Feed (pph) | Feed Rate pph/min | Conv. % | Graft Level pph | Graft Eff. % | MFR (dg/min) |
|---|---|---|---|---|---|---|---|
| 9[b] | Ex. 1 | 40.4 | 1.01 | 97 | 35.8 | 91 | 4.4 |
| 10[c] | Ex. 1 | 30.3 | 4.04 | 87 | 23.1 | 87 | 5.0 |
| 11[d] | Ex. 3 | 20.2 | 4.04 | 98 | 17.8 | 90 | 5.6 |

[a]350 g polypropylene, 3.5 g peroxy compound, 354 g styrene
[b]Reactor temperature: 80° C.; peroxide half-life: 230 min; delay between peroxide and styrene additions: 15 min. 450 g polypropylene, 4.5 g peroxy compound, 182 g styrene
[c]Reactor temperature: 120° C.; peroxide half-life: 4 min; delay between peroxide and styrene additions: 5 min. 450 g polypropylene, 4.5 g peroxy compound, 136 g styrene
[d]450 g polypropylene, 4.5 g peroxy compound, 91 g styrene.

CONTROL EXPERIMENTS 1-3

The procedure and ingredients of Example 1 are used for Control Experiment 1 with the exception that 350 g of the propylene homopolymer, 3.5 g of the peroxy compound, and 248 g of the styrene are used, and the styrene is sprayed into the reactor at a rate of 4.5 pph/min (total addition time: 16 minutes). The conversion is 95%, and the graft efficiency 62%. The MFR is 3.1 dg/min.

The procedure and ingredients of Example 3 are used for Control Experiment 2 with the exception that 350 g of the propylene homopolymer, 3.5 g of the peroxy compound, and 248 g of the styrene are used, and the styrene is sprayed into the reactor at a rate of 4.5 pph/min (total addition time: 16 minutes). The conversion is 96%, and the graft efficiency 40%. The MFR is 2.9 dg/min.

The procedure and ingredients of Example 9 are used for Control Experiment 3 except that the reactor temperature is 130° C., the peroxide half-life is 1 min at 130° C., and the styrene feed rate is 0.95 pph/min. The graft efficiency is 91%, but the conversion is only 44%. The MFR is 6.5 dg/min.

EXAMPLE 12-13

The procedure and ingredients of Example 9 are used except that 4.5 g of tert-butyl peroxypivalate (Example 12) and a mixture of 2.25 g of tert-butylperoxy 2-ethylhexanoate and 2.25 g of 1,1-dimethyl-3-hydroxybutylperoxy 2-ethylhexanoate (Example 13) are substituted for the peroxy ester used in Example 9.

In Example 12, the initiator half-life is 32 minutes and the styrene feed rate 0.95 pph/min. The conversion is 93%, the graft level 33.6 pph, the graft efficiency 89%, and the MFR 3.4 dg/min.

In Example 13, the reactor temperature is 90° C., the initiator half-lives are 80 minutes and 20 minutes, respectively, the styrene feed rate is 1.01 pph/min, and the delay between peroxide and styrene additions is 10 minutes. The conversion is 98%, the graft level 35.1 pph, the graft efficiency 88%, and the MFR 7.5 dg/min.

EXAMPLE 14

The procedure and ingredients of Example 3 are used except that the styrene feed level (162 g added) is 40.4 pph, the styrene addition rate is 1.14 pph/min, and the polypropylene used is Pro-fax 6501 having an IV of 2.5 dl/g, a MFR of 4.0 dg/min, a surface area (B.E.T) of 2.0 m$^2$/g, a pore volume fraction (by mercury porosimetry) of 0.15, a weight average diameter of 0.2 mm, a bulk density of 0.53 g/ml, and a solubility in methylene chloride of 1.3 wt %. None of the pores in the particles are larger than 1 micron in diameter. The conversion is 93%, the graft level 31.0 pph, and the graft efficiency 82%.

EXAMPLE 15

The procedure and ingredients of Example 3 are used except that methyl methacrylate (29 pph) is used instead of styrene, the monomer/initiator mixture is added at a rate of 1.01 pph/min and the reactor temperature is 85° C. The amount of propylene homopolymer used is 450 g, peroxy compound 4.5 g, and methyl methecrylate 135 g. The conversion is 86%, graft level 23.5 pph, and graft efficiency 90%.

EXAMPLE 16

The procedure and ingredients of Example 1 are used except that methyl methacrylate (31.3 pph) is substituted for styrene, di(4-tert-butylcyclohexyl)peroxy dicarbonate (0.49 pph) is substituted for the peroxy ester, the amount of propylene homopolymer used is 450 g, the reactor temperature is 70° C., and the monomer is added at a rate of 1.4 pph/min. The conversion is 98%, the graft level 26.7 pph, the graft efficiency 85%, and the MFR 3.2 dg/min.

EXAMPLE 17

The procedure and ingredients of Example 1 are used except that butyl acrylate (17.6 pph) is used instead of styrene and added at a rate of 1.17 pph/min (over 15 minutes), and 0.63 pph of the peroxy compound and a larger reactor are employed. The reactor is maintained at 105° C. for 3 hours after all of the monomer has been added. A vacuum then is applied at 104° C. for 1 hour followed by a 4-hour nitrogen purge at 120° C. The conversion level is approximately 16.0 pph, the conversion 91%, and the MFR 10.4 dg/min.

EXAMPLE 18

The procedure and ingredients of Example 17 are used except that an ethylene/propylene random copolymer having an ethylene content of about 4.0% is substituted for the propylene homopolymer, and a mixture of styrene (4.42 pph) and butyl acrylate (13.24 pph) is used instead of butyl acrylate and added at a rate of 1.18 pph/min. (over 15 minutes). The peroxide addition level is 0.5 pph, and the reactor temperature 100° C. The four-hour nitrogen purge is at 100° C. The conversion level for both monomers is 17.6 pph, the conversion 100%, and the MFR 9.7 dg/min.

EXAMPLE 19

The procedure and ingredients of Example 17 are used except that a chemically blended EPR-modified propylene homopolymer having a MFR of 4.89 dg/min, a polypropylene content of about 88%, and an EPR content of about 12%, with an ethylene content of about 8%, is substituted for the propylene homopolymer, and styrene (53.8 pph) is substituted for the butyl acrylate. The styrene addition rate is 1.79 pph/min (30-minute addition period). The reactor temperature is 101° C., and the peroxide addition level 0.25 pph. The nitrogen purge is conducted at 100° C. for 5 hours. The conversion level is 45.5 pph, the conversion 85%, and the MFR 2.2 dg/min.

EXAMPLE 20

The procedure and ingredients of Example 19 are used except that the EPR-modified propylene homopolymer used has a polypropylene content of 40% and an EPR content of 60%, with an ethylene content of 39%, and a MFR of 16 dg/min. The conversion level is 53.8 pph, the conversion 100%, and the MFR 2.1 dg/min.

CONTROL EXPERIMENT 4

The procedure and ingredients of Example 17 are used with the following exceptions:

Pro-fax 6301 polypropylene having a MFR of 12.0 dg/min, a pore volume fraction of 0.15, and a weight, average diameter of 0.2 mm is used instead of LBD-406A. None of the pores in the particles are larger than 1 micron in diameter. The grafting monomer is n-butyl methacrylate (17.1 pph), added at a rate of 0.56 pph/min (over a period of 23 minutes). The initiator is tert-butyl-2-ethylhexylperoxy dicarbonate (1.3 pph), the reactor temperature is 135° C., and the product is vacuum-dried at 135° C. for 5 hours. The conversion is 77%, and the MFR 152 dg/min.

EXAMPLE 21

The procedure and ingredients of Example 1 are used except that 1952 g of propylene homopolymer is used instead of 400 g, a 10 liter steel reactor is used instead of a 2 liter glass reactor, and the procedure is changed as set forth below.

The reactor is purged with nitrogen at room temperature until the active oxygen level reaches 20 ppm and then heated to 120° C. (±1.5° C.) by circulating hot oil through the reactor jacket, and equilibrated to that temperature while nitrogen purging and stirring at 190 rpm continues. Styrene (1280 g), acrylonitrile (408.6 g) and an oxygen-free mineral spirit solution of tert-butylperoxy 2-ethylhexanoate (78 g of solution, 50% by weight of mineral spirits) are added to a steel pressure cylinder and purged with nitrogen. The monomers/peroxide mixture is fed to the reactor contents at a rate of 1.02 pph (parts per 100 parts polypropylene, by weight) per minute while maintaining the temperature of the reactor contents at 120° C. (±1.5° C.). The total addition time is 85 minutes. The reactor is maintained at 120° C. with stirring for an additional 30 minutes following complete addition of the monomers. At the end of the grafting reaction period, a vacuum is drawn on the reactor contents and the temperature increased to 140° C. The total heat up time under vacuum is 22.8 minutes. Once the temperature reaches 140° C., the vacuum is broken with nitrogen and the contents purged with nitrogen for 30 minutes. After cool-down under a nitrogen blanket, the free-flowing solid product remaining in the reactor is discharged therefrom, dried, and weighed. Final weight of the product is 3597.7 grams, representing a conversion of 97.3%.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A method of making a polyolefin graft copolymer comprising, in a substantially non-oxidizing environment, (a) treating a particulate olefin polymer material at a temperature of about from 60° to 125° C. with about from 0.1 to 6.0 pph of an organic compound which is a chemical free radical polymerization initiator and has a decomposition half-life at the temperature used of about from 1 to 240 minutes;

(b) treating said olefin polymer material at said temperature over a time period which coincides with or follows (a), with or without overlap, with about from 5 to 240 pph of at least one grafting monomer capable of being polymerized by free radicals, said monomer being added to said olefin polymer material over a time period from 5 minutes to 3–4 hours to provide a rate of addition which is less than about 4.5 pph per minute at any addition level; and thereafter (c) removing any unreacted grafting monomer from the resultant grafted particulate olefin polymer material, and decomposing any unreacted initiator and deactivating any residual free radicals in said material.

2. The method of claim 1 wherein said grafting monomer is selected from the group consisting of vinyl-substituted aromatic, heterocyclic, and alicyclic compounds, unsaturated aliphatic carboxylic acids and derivatives thereof, unsaturated aliphatic nitriles, vinyl esters of aromatic and saturated aliphatic carboxylic acids, and mixtures thereof.

3. The method of claim 1 wherein said olefin polymer material, after the addition of said monomer thereto, is maintained in contact with said monomer at the temperature employed for at least about 10 minutes.

4. The method of claim 1 wherein in (c) said grafted olefin polymer material is maintained at a temperature of at least about 110° C. for at least about 5 minutes.

5. The method of claim 1 wherein said organic compound is a peroxy compound.

6. The method of claim 5 wherein more than about 40 pph of said grafting monomer is added to said olefin polymer material at a rate of about from 0.3 to 3.0 pph/minute.

7. The method of claim 5 wherein said grafting monomer is added to said olefin polymer material over a time period which coincides with the period over which said peroxy compound is added thereto.

8. The method of claim 5 wherein said grafting monomer is added to said olefin polymer material over a time period which follows the period over which said peroxy compound is added thereto.

9. The method of claim 8 wherein the time period over which said grafting monomer is added to said olefin polymer material follows the time period over which said peroxy compound is added thereto after a delay of up to about 2.5 initiator half-lives.

10. The method of claim 1 wherein said olefin polymer material is a selected from the group consisting of an ethylene homopolymer, an ethylene copolymer, a propylene polymer material and a 1-butene homopolymer.

11. The method of claim 10 wherein said olefin polymer material has (a) a pore volume fraction of at least about 0.07 wherein more than 40% of the pores have a diameter larger than 1 micron; (b) a surface area of at least 0.1 m$^2$/g; and (c) a weight average diameter in the range of about from 0.4 to 7 mm.

12. The method of claim 5 wherein said olefin polymer material is treated at a temperature of about from 80° to 120° C.

13. The method of claim 6 wherein said organic peroxy compound is a peroxy ester or peroxy carbonate.

14. The method of claim 13 wherein the half-life of said peroxy compound at the temperature employed is about from 5 to 100 minutes.

15. The method of claim 5 wherein the amount of said peroxy compound with which said olefin polymer material is treated is about from 0.2 to 3 pph.

16. The method of claim 5 wherein said grafting monomer is selected from the group consisting of styrene, alkyl-substituted styrenes, esters of acrylic and methacrylic acids, acrylonitrile and mixtures thereof.

17. The method of claim 6 wherein said grafting monomer is selected from the group consisting of styrene, alkyl-substituted styrenes, esters of acrylic and methacrylic acids, and mixtures thereof.

18. The method of claim 6 wherein in (c) said grafted olefin polymer material is maintained at a temperature of at least 120° C. for at least 20 minutes.

19. The method of claim 5 wherein said grafting monomer is used neat.

20. The method of claim 5 wherein said grafting monomer is in solution.

21. The method of claim 3 wherein the decomposition half-life of said chemical free radical polymerization initiator at the temperature employed is about from 10 to 40 minutes.

* * * * *

UNITED STATES PATENT AND TRADEMARK OFFICE
CERTIFICATE OF CORRECTION

PATENT NO. : 5,140,074

DATED : August 18, 1992

INVENTOR(S) : Anthony DeNicola, Jr. et al

It is certified that error appears in the above-identified patent and that said Letters Patent is hereby corrected as shown below:

Col. 3, line 15, change "o:" to --of:--.

Col. 10, line 17, change "remaines" to --remains--.

Col. 10, line 22, change "6%" to --86%--.

Col. 11, line 62, change "nlercury" to --mercury--.

Signed and Sealed this

Twenty-first Day of December, 1993

Attest:

BRUCE LEHMAN

*Attesting Officer*     *Commissioner of Patents and Trademarks*